United States Patent [19]

Stein

[11] Patent Number: 5,630,359
[45] Date of Patent: May 20, 1997

[54] APPARATUS FOR THE DISCONTINUOUS PREPARATION OF PORTIONED PASTA PRODUCTS AND APPARATUS FOR PORTIONING A PREDETERMINED AMOUNT OF LONG-STEMMED PASTA PRODUCTS

[75] Inventor: Hans-Ulrich Stein, Comano, Switzerland

[73] Assignee: Alitecnica S.A., Switzerland

[21] Appl. No.: 648,057

[22] PCT Filed: Oct. 12, 1994

[86] PCT No.: PCT/EP94/03366

§ 371 Date: May 20, 1996

§ 102(e) Date: May 20, 1996

[87] PCT Pub. No.: WO95/14415

PCT Pub. Date: Jun. 1, 1995

[30] Foreign Application Priority Data

Nov. 20, 1993 [DE] Germany .................. 43 39 594.5

[51] Int. Cl.[6] .................. A23L 1/00; A47J 19/00; A47J 27/00; G01F 11/00
[52] U.S. Cl. .................. 99/407; 99/330; 99/352; 99/403; 99/410
[58] Field of Search .................. 99/403–410, 330, 99/411–418, 352–355, 357; 222/390, 405, 504; 126/369, 373

[56] References Cited

U.S. PATENT DOCUMENTS

| | | | |
|---|---|---|---|
| 3,608,473 | 9/1971 | Kearn et al. | 99/336 |
| 3,958,503 | 5/1976 | Moore | 99/327 |
| 4,347,833 | 9/1982 | Luebke et al. | 126/369 |
| 4,803,916 | 2/1989 | Tacconi | 99/352 |
| 4,803,917 | 2/1989 | Barbieri | 99/407 X |
| 5,070,774 | 12/1991 | Rosso et al. | 99/330 |
| 5,142,966 | 9/1992 | Morandi et al. | 99/352 |
| 5,172,627 | 12/1992 | Narcisi et al. | 99/330 |
| 5,191,829 | 3/1993 | Caffarella | 99/352 |
| 5,215,001 | 6/1993 | Narcisi | 99/357 |
| 5,228,382 | 7/1993 | Hayashi et al. | 99/328 |
| 5,351,605 | 10/1994 | Sai et al. | 99/330 |
| 5,531,362 | 7/1996 | Bottacco | 222/390 |

FOREIGN PATENT DOCUMENTS

| | | |
|---|---|---|
| 494966 | 5/1976 | Australia . |
| 0068060 | 1/1983 | European Pat. Off. . |
| 0296549 | 12/1988 | European Pat. Off. . |
| 7408827 | 1/1976 | Netherlands . |
| 440872 | 1/1968 | Switzerland . |
| 87/00741 | 2/1987 | WIPO . |
| 92/18040 | 10/1992 | WIPO . |

*Primary Examiner*—Timothy F. Simone
*Attorney, Agent, or Firm*—Andrus, Sceales, Starke & Sawall

[57] ABSTRACT

An apparatus for the discontinuous preparation of portioned pasta products, in particular spaghetti, with a supply container to receive the raw products, a cooking chamber (1) and a draining chamber (2), wherein the cooking chamber (1) and the draining chamber (2) can each be closed by valves in their inlet region (1E, 1A) and outlet region (2A), the overall height of the apparatus being kept small by constructing the valves in the inlet region (1E) of the cooking chamber (1) and the outlet region (2A) of the draining chamber (2) as shut-off flaps (3, 4) that can be moved linearly in a direction transverse to the inlet and outlet direction and are spaced apart from the chamber wall containing the respective opening (1E, 2A) during this movement, and that to close the openings at the end of the linear movement, the shut-off flaps (3, 4) are pressed against the respective chamber (1, 2) in a direction perpendicular to the plane of the opening by means of a lever mechanism (36, 37A, 37B).

15 Claims, 7 Drawing Sheets

APPARATUS FOR THE DISCONTINUOUS PREPARATION OF PORTIONED PASTA PRODUCTS AND APPARATUS FOR PORTIONING A PREDETERMINED AMOUNT OF LONG-STEMMED PASTA PRODUCTS

BACKGROUND AND SUMMARY OF THE PRESENT INVENTION

The invention relates to an apparatus for the discontinuous preparation of portioned pasta products, in particular spaghetti, with a supply container to receive the raw products, a cooking chamber and a draining chamber, wherein the cooking and draining chambers can each be closed by valves in their inlet and outlet regions, and in addition an apparatus for portioning a predetermined amount of long-stemmed pasta products, in particular spaghetti, and transferring them into the cooking chamber of the former apparatus.

Apparatus for the discontinuous preparation of portioned pasta products have been designed in many different ways. Their purpose is to prepare a portioned amount of raw pasta product in the shortest possible time, and therefore they are employed in food-dispensing automats. One such known apparatus is disclosed in WO 90/04345. There the raw products situated above a cooking chamber are delivered in portions into the cooking chamber, the chamber is closed, and the pasta products are cooked at a preset temperature and corresponding pressure for a relatively short time. The cooked pasta products then leave the chamber along with the cooking water and pass into a connected draining chamber where the water is removed. Finally they are transferred to a suitable receptacle, for example a plate.

The cooking chamber is closed by two ball valves, one in the inlet region and the other in the outlet region, an arrangement that both allows filling and emptying of the cooking chamber and also, during the cooking process, guarantees that the cooking chamber is securely sealed. However, because ball valves operate with relatively high friction, they are extremely sluggish and a degree of force is needed to actuate them, so that as a rule pneumatic actuators are employed. Another disadvantage of ball valves is that they are relatively tall components, so that they increase the overall height of the above-mentioned apparatus. Finally, the use of a ball valve in the outlet region of the cooking chamber is not optimal because the pasta products—now cooked and hence delicate—can be damaged when passing through the valve.

It is therefore the object of the invention to design and develop an apparatus for discontinuous preparation of portioned pasta products of the kind cited above in such a way that the above-mentioned disadvantages are avoided and, in particular, the overall height of the whole apparatus, determined substantially by the vertically stacked elements supply container, cooking chamber and draining chamber, is kept as small as possible. Furthermore, it is desired that the cooked products be passed on to the consumer in as nearly undamaged a state as possible. Finally, the apparatus is to be made simple in construction so as to ensure that after a cooking process no remnants of pasta are left within the chambers.

This object is achieved in a first embodiment of the invention by constructing the valves in the inlet region of the cooking chamber and in the outlet region of the draining chamber in the form of shut-off flaps that slide transversely with respect to the input and output directions in a linear motion, while spaced apart from the associated chamber wall in which the opening is disposed, and by moving the shut-off flaps into the closed position at the end of the linear motion by means of a lever mechanism that presses the flap against the opening of the associated chamber in a direction perpendicular to the plane of the opening. In respect of the apparatus for portioning a predetermined amount of long-stemmed pasta product, the problem is solved in accordance with the invention in that the products are stored horizontally in at least one funnel-shaped container, that a dosing plate of adjustable height is provided at the bottom of each funnel-shaped container, that the stored products are divided into portions by separating out a desired amount thereof with a separation plate disposed above each dosing plate, and that a delivery vessel that can be pivoted over 90 ( is provided in the region below each dosing plate and serves to load the cooking chamber.

The known ball valve is thus replaced, in accordance with the invention, by a linearly displaceable shut-off flap that is first shifted laterally and only thereafter is pressed against the corresponding chamber opening. This pressing is accomplished by a lever mechanism, so that the driving power can be made extremely small for both the linear motion and the lever movement. As a result, the height of the valve components in the apparatus in accordance with the invention is very favorable, so that the overall height of the apparatus becomes small enough to enable convenient handling of the automat equipped with the apparatus in accordance with the invention. It is possible to achieve an overall height of little more than one meter.

In a further development of the invention, only a single motor is provided to move the shut-off flap in both directions, i.e. the horizontal linear displacement and the vertical pressing direction. For this purpose, as additionally taught by the invention, it has proved especially advantageous to provide a sliding clutch so that when the shut-off flap has reached its final position for closure, the flap itself stays in that position although linear movement of the driving means is continued in order to actuate the lever mechanism. In this way rapid and secure closure can be guaranteed without elaborate construction.

As still another development of the invention, in the outlet region of the cooking chamber and in the inlet region of the draining chamber there is provided a single valve in the form of a pivoted shut-off flap, which is closed and locked by means of a linear drive and an articulated-lever mechanism. In this case it is advisable for the flap to be disposed inside the draining chamber, to ensure that the cooking chamber will be completely emptied. The linear drive means for this valve is preferably disposed outside the draining chamber.

The use of an articulated-lever mechanism is especially important, because here again a drive motor of relatively small dimensions is desirable and the articulated-lever construction isolates the motor from the high pressures of several bar that are generated in the cooking chamber during cooking.

Cooking chambers closed with the shut-off flaps described above have been shown to withstand pressures up to 50 bar, although in subsequent operation such high pressures are very unlikely to occur. As the linear drive means, in a preferred embodiment a piston/cylinder unit is provided.

To obtain optimal sealing in accordance with the invention, all shut-off valves and/or chamber walls in the plane of the opening are provided with sealing elements. In this regard it is advisable that there be disposed in the region of each chamber opening a sealing element matched in shape to the contour of the opening.

It is especially advantageous that the openings be made round in cross section, and that O-rings be provided as sealing elements. The O-rings employed here have a relatively long service life, because all the shut-off flaps are set onto the openings in a nearly perpendicular direction so that no shearing off, pinching or slippage can occur. Furthermore, when the shut-off flap is open, O-rings are easily exchangeable.

It was mentioned above that the height of the portioning apparatus in accordance with the invention is also extremely small. The reason is that the horizontally stored raw pasta products, such as spaghetti or the like, are discharged into delivery vessel, disposed beside the wall of the supply container, which tilts them from the horizontal into a vertical position. According to another teaching of the invention, two supply containers are provided, their two parallel walls being spaced apart from one another in such a way as to create a space between the two supply containers within which the delivery vessel can pivot.

This arrangement ensures that even with long pasta products, such as spaghetti, the floor of the supply container (s) can be disposed only slightly above the opening of the cooking chamber.

When the apparatus in accordance with the invention is in operation, the heat within the cooking chamber cannot be completely dissipated; as a result, it can happen that the normally relatively rigid pasta products acquire a somewhat softer consistency. In order that a specific volume of raw products can nevertheless be separated without destroying or damaging the raw pasta products, according to a further teaching of the invention a separation plate with a rounded edge is provided, and when the separation plate has been inserted into the supply container, its rounded edge rests above a projection without touching the wall of the supply container.

This is a reliable means of preventing any crushing or breakage of the products due to the mechanical action of the separation plate. It has proved unnecessary for the separation plate to touch either the opposing wall or the projection attached to this wall; instead, it is particularly useful for the distance between the separation plate pushed into the supply container and the projection to correspond approximately to the diameter of the pasta products being processed. That is, the arrangement prevents further products from slipping out after the desired amount has been removed, inasmuch as the products resting on the projection reliably "plug" the gap between projection and separation plate.

BRIEF DESCRIPTION OF THE DRAWINGS

In the following the invention is explained in greater detail including description of additional characteristics and advantages as well as examples of preferred embodiments, with reference to the attached drawings, wherein.

DESCRIPTION OF THE ILLUSTRATION EMBODIMENT

Figure 1:
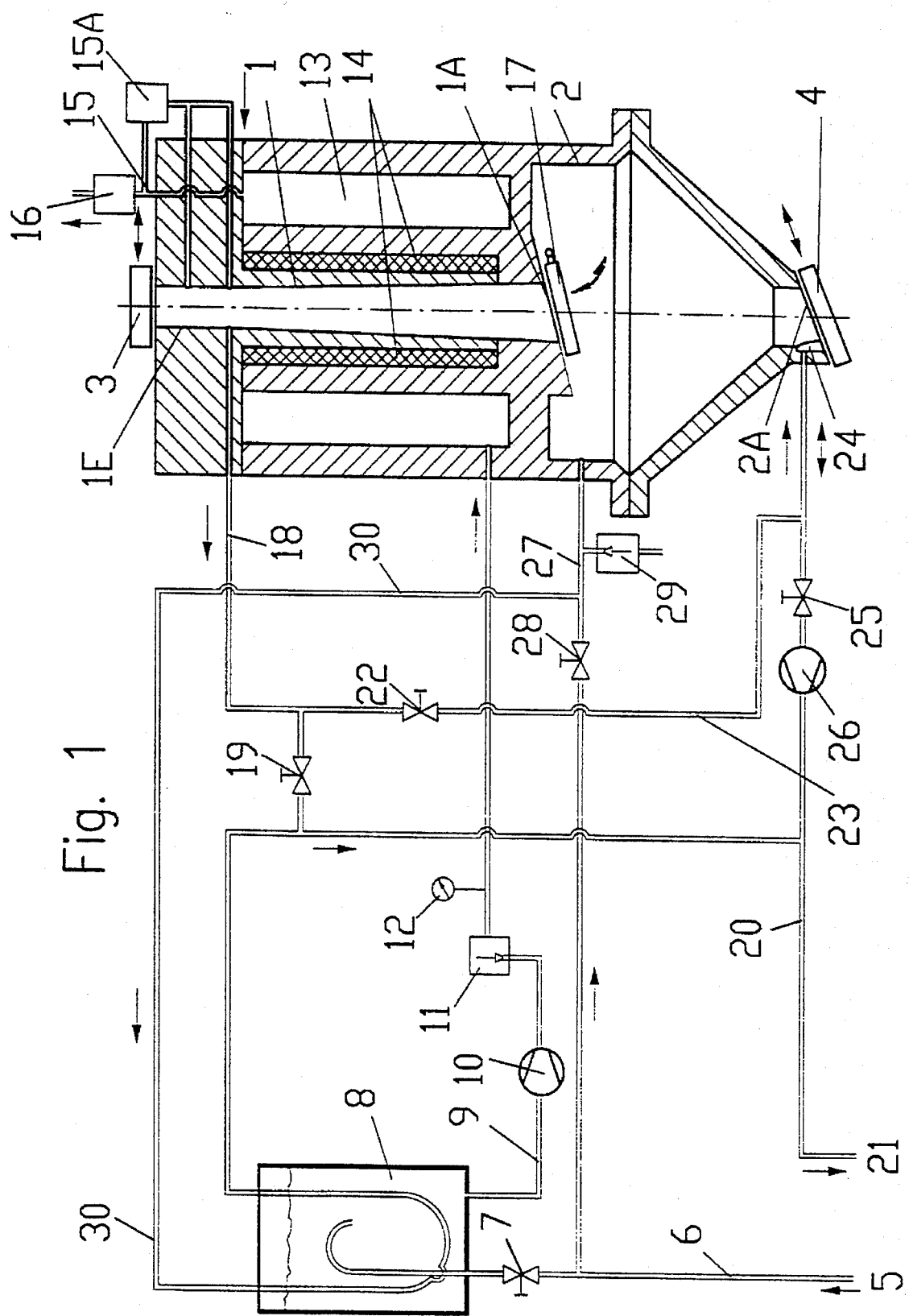
FIG. 1 is a schematic drawing to show the function of the apparatus in accordance with the invention.

With reference to FIG. 1, the apparatus in accordance with the invention will now be described in detail. The apparatus consists substantially of a cooking chamber 1 with a cooking-chamber inlet 1E and a cooking-chamber outlet 1A. It is not shown here that above the cooking chamber 1 a portioning apparatus is disposed, from which the cooking chamber 1 is loaded. Below the cooking chamber 1 is a draining chamber 2, the inlet to which is identical with the outlet 1A from the cooking chamber. At the floor of the draining chamber 2 is a draining-chamber outlet 2A. In accordance with the invention the cooking chamber 1 can be closed in its inlet region 1E by a linearly displaceable shut-off flap 3, and the outlet region 2A of the draining chamber 2 can be closed by a linearly displaceable shut-off flap 4.

The actual preparation process is as follows:

After the predetermined amount of pasta products has been put into the cooking chamber 1, which has already been closed in its lower region, i.e. the outlet region 1A, the top of the cooking chamber 1 is closed by means of the linearly displaceable shut-off flap 3. From a fresh-water supply 5, by way of a pipe 6 and an opened stop valve 7, fresh water is let into a reservoir 8. From there the water is sent through a pipe 9 by means of a pump 10, passes through a reflux valve 11 with a preset pressure that can be read off from a manometer 12, and enters the heating chamber 13 that surrounds the cooking chamber 1 so as to leave an annular gap. In the space between the walls of cooking chamber 1 and heating chamber 13, heating rods 14 are disposed.

Before the actual heating process begins, enough water is put into the heating chamber 13 to fill it completely and also allow a predetermined amount of water to pass into the cooking chamber 1, by way of a filling pipe 15 that is equipped with a pressure-relief valve 16. When the cooking chamber 1 has been filled to the desired degree, a stop valve 15A in the filling pipe 15 is closed, so that the cooking chamber 1 is hermetically sealed. In its outlet region 1A this closure is achieved by a shut-off flap 17 to be described below.

The oberpressure prevailing in the cooking chamber 1 after the actual cooking is completed is released by opening a stop valve 22 in a pressure-relief pipe 18, which is connected by way of a stop valve 19 to a drainage pipe 20 that opens into a drain 21, and also connected by way of the stop valve 22 and a pipe 23 to the draining chamber 2. With this arrangement, the pressures in the cooking chamber 1 and draining chamber 2 are brought to about the same level. After the stop valve 22 has been closed, the shut-off flap 17 can be opened, and the cooked pasta products fall into the draining chamber 2 along with the residual cooking water.

A sieve 24 disposed in the floor region of the draining chamber 2 covers the opening leading to the pipe 23. After the stop valve 22 has been closed and the stop valve 25 has been opened, a drainage pump 26 withdraws the water from the products in the draining chamber 2. The sieve 24 ensures that the products do not leave the draining chamber 2. During the draining process, the excess pressure still present in the draining chamber is relieved. This is accomplished by a pipe 27, which is connected to the fresh-water pipe 6 by way of a stop valve 28 and is provided with a ventilation valve 29 in the vicinity of its opening into the draining chamber 2. Hot steam from the draining chamber 2 passes through a prewarming pipe 30 into the reservoir 8, where it contributes to warming the fresh water that will later be heated by the heating rods 14. The prewarming pipe 30 terminates in the water pipe 20 and thereby communicates with the drain 21.

After the pasta products have been separated from the cooking water, the finished portion of pasta products can be released from the chamber by way of the linearly displaceable shut-off flap 4, onto a plate or the like situated below the draining chamber 2.

It is only shown schematically that the cross section of the cooking chamber 1 expands conically downward. This construction reliably prevents the cooked pasta products from becoming stuck in the lower region. Obviously the inner surfaces of the chambers 1 and 2 must be smooth and not sticky, or be provided with a suitable non-stick coating. In order to clean the draining chamber 2, after the pasta products have been removed and the shut-off flap 4 has been closed again, fresh water is introduced into the draining chamber 2 by way of the pipe 6, by opening the stop valve 28. After the draining chamber 2 has been filled and the stop valve 28 closed, the stop valve 25 is opened and the pump 26 activated, so that the water flows out through the sieve 24, through the drainage pipe 20 and into the drain 21, until the draining chamber 2 is completely empty.

Figure 2:
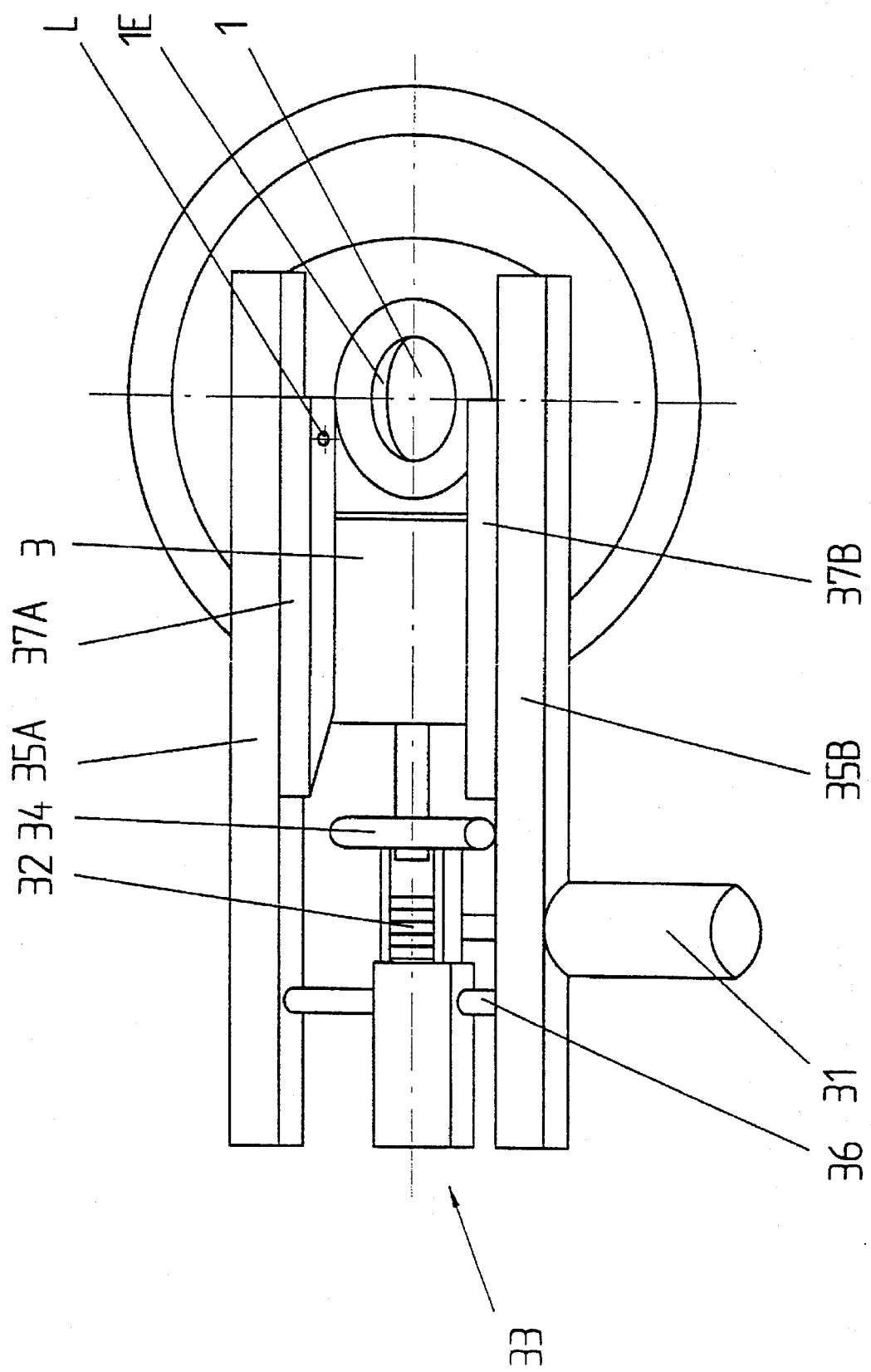
FIG. 2 shows a closure valve of the apparatus in accordance with the invention in perspective view.
Figure 3:
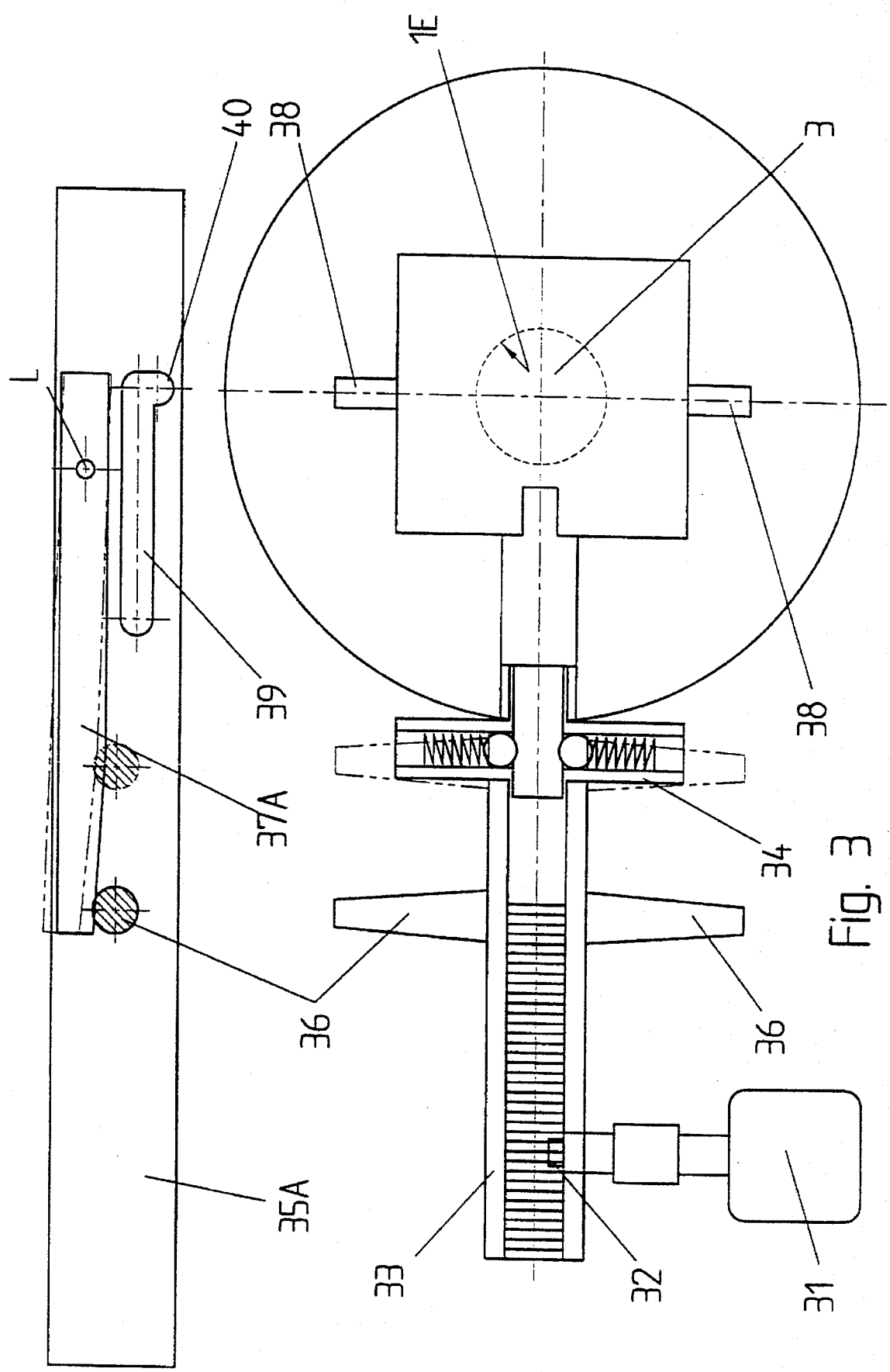
FIG. 3 is a schematic drawing of the closure device according to FIG. 2.

In the preferred exemplary embodiment shown here the shut-off flaps 3 and 4 are almost identical in their construction; therefore their function will be described with reference solely to shut-off flap 3, as shown in FIGS. 2 and 3. The invention can usefully be designed in the manner exemplified by this embodiment, in which a single motor 31 is used to move the shut-off flap 3 in both directions. This motor operates by way of a pinion 32 and a rack not shown here in detail, to produce linear motion of a carriage 33. As a result, the shut-off flap 3 is moved over the cooking-chamber inlet 1E, shown open in FIG. 2.

After the carriage 33 has reached its end position, a sliding clutch 34 incorporated into the carriage 33 causes the further linear motion produced by the motor 31 to be used for activation of a lever mechanism. For this purpose, to the two rails 35A and 35B provided to guide the carriage 33, which are rigidly connected to one another in a suitable manner, there are attached guidance and locking means. Locking bolts 36 are mounted on the carriage 33 in such a way that they extend towards the rails 35A and 35B and are brought under the slanting surfaces of the wedge-levers 37A and 37B mounted to the rails 35A and 37A, respectively.

After the linear movement of the shut-off flap 3 has been concluded, the sliding clutch 34 is activated, so that the locking bolts 36 are pressed under the slanting surfaces of the wedge-levers 37A and 37B, which are mounted so as to pivot about a bearing point L above the cooking-chamber inlet 1E. With this arrangement, an extremely slight driving force can suffice to press the shut-off flap 3 against the cooking chamber 1 and securely close the opening.

In FIG. 3 the closing process is again diagrammed. For clarity only one rail, 35A, is shown in side view above the plan view of the carriage 33. This drawing shows clearly that the movement of the shut-off flap 3 can be guided by guide rods 38 that extend into elongated holes 39 in the rails 35A and 35B. The shut-off flap 3 is shown in its closed position in FIG. 3. Here the guide rod 38 abuts against the end of the elongated hole 39, where an elongated recess 40 extends down toward the cooking chamber 1.

The function of the sliding clutch 34 is indicated in FIG. 3 by an arrangement not described in detail here, comprising spheres that are pressed into notches in a bolt by coil springs. Clearly, other known kinds of sliding clutch can also be used. After the shut-off flap 3 has reached its end position, the carriage 33 bearing the locking bolts 36 continues to be moved by the motor 31, overcoming the spring tension of the coil springs, and proceeds forward until the locking bolts 36 have arrived in the position indicated by the dot-dash lines.

As a result, the wedge levers 37A and 37B are pivoted about the bearing point L, so that a large force is exerted on the shut-off flap 3, the movement of which is now guided by its guide rods 38 within the recess 40. This kind of closure is particularly useful because sealing elements (not shown) disposed around the inlet opening can never be sheared off or unevenly loaded. Instead, the shut-off flap 3 at first moves over the opening of the associated chamber while spaced apart therefrom, so that a load is imposed on the sealing elements only as a result of a closing movement perpendicular to said elements, and this load is uniformly distributed.

Figure 4:
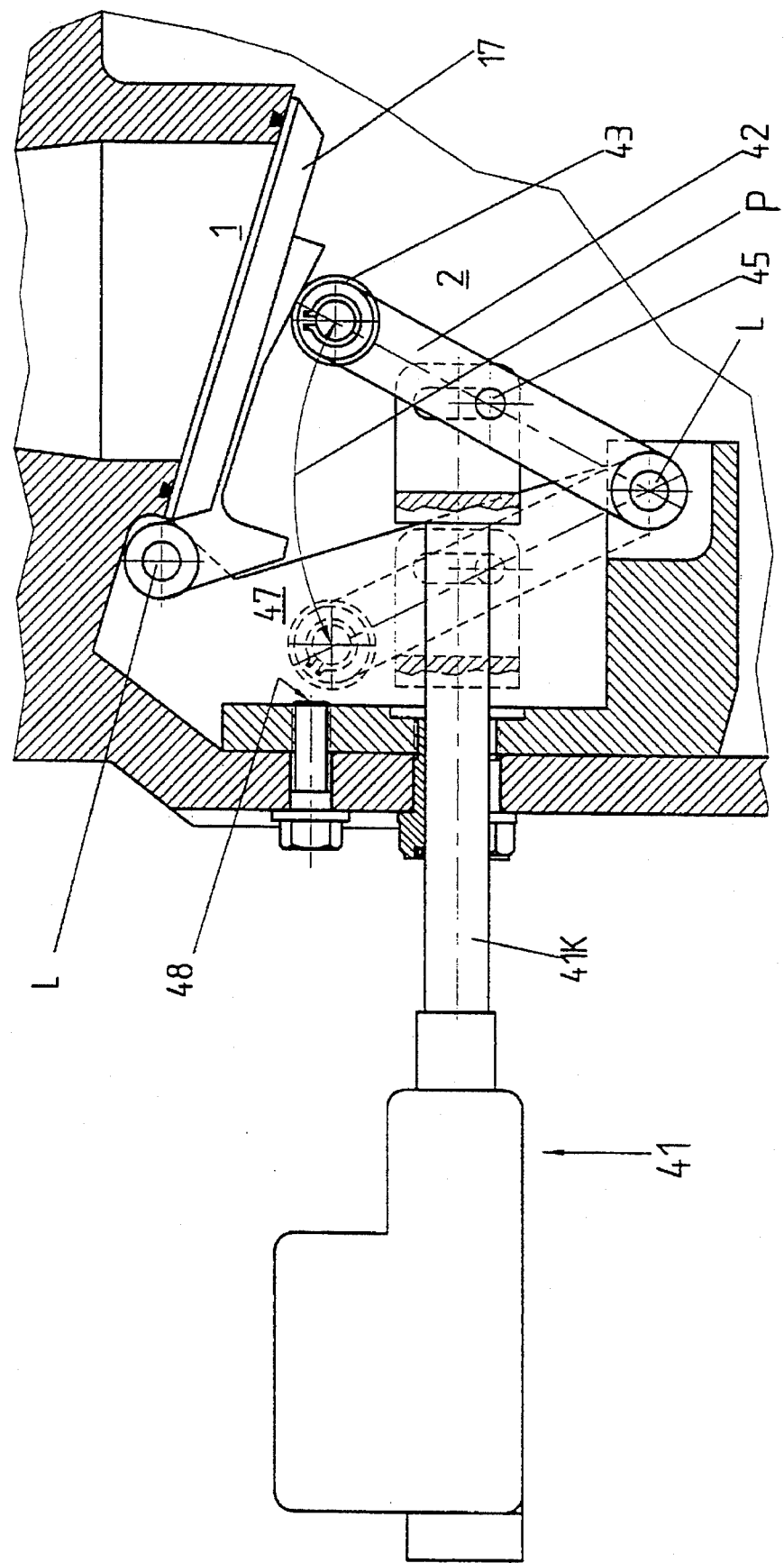
FIG. 4 is a schematic drawing of the closure valve between cooking chamber and draining chamber.

FIG. 4 shows schematically that in the outlet region 1A of the cooking chamber 1 and in the inlet region of the draining chamber 2, closure is brought about by the shut-off flap 17 and an articulated-lever mechanism described in detail below. The shut-off flap 17 is moved into place by a linear drive means that is here merely represented schematically by a piston/cylinder unit. An articulated lever 42, disposed within the draining chamber 2 so that it pivots about a bearing L, is provided at its end away from the bearing L with a clamping roller 43. The connection between the piston 41K and the lever 42 consists of a connecting link 44 within which is mounted a link block 45. When the piston is actuated, the lever is brought into the position shown by solid lines, in which process the clamping roller 43 moves the shut-off flap 17 into the closed position and the pressure generated during the cooking process, which acts on the shut-off flap 17, is absorbed by the bearing L with no damage to the drive mechanism.

Figure 5:
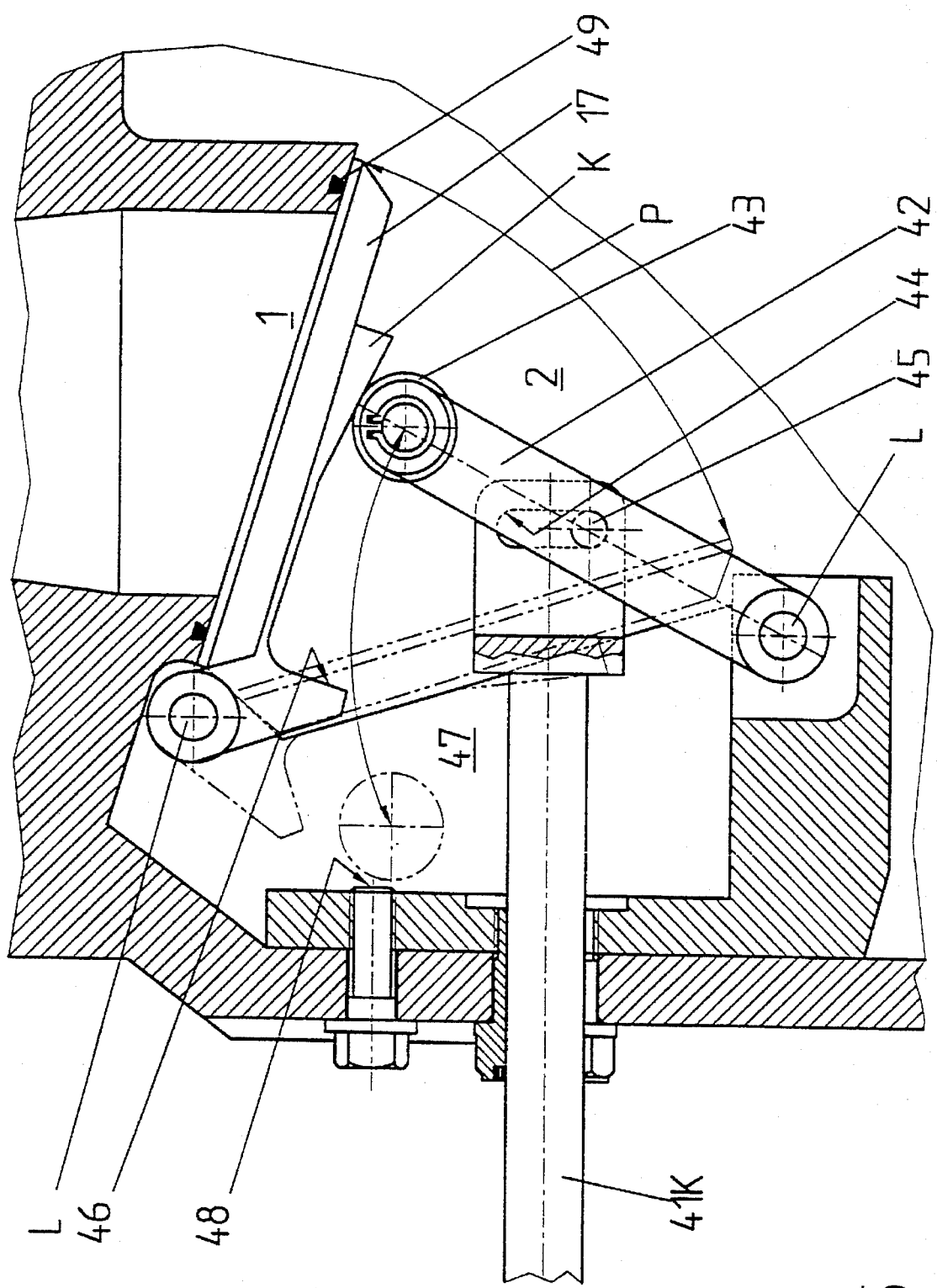
FIG. 5 shows the shut-off flap and the articulated-lever mechanism of FIG. 4 in greater detail.

In FIG. 5 the articulated-lever mechanism to close the shut-off flap 17, as described above, is shown in greater detail. Here it can be seen that the shut-off flap 17 comprises not only a shut-off wedge K that cooperates with the clamping roller 43, but also a shoulder 46 adjacent to its bearing L, which interacts with the clamping roller 43 to ensure that when the piston 41K is pulled back, the shut-off flap 17 is reliably forced open. This movement of shut-off flap 17, articulated lever 42 and clamping roller 43 is indicated by arrows; when it is completed, the shut-off flap 17 remains in the position indicated by dot-dash lines.

Covers 47 are disposed on either side of the piston 41K (of which only the one at the back is shown here) in such a way that the whole articulated lever 42 with clamping roller 43 and the link assembly 44, 45 lie inside the covers 47 and are shielded from the lower surface of the shut-off flap 17, so that they are reliably prevented from touching the pasta products. The drawing also shows that the clamping roller 43 abuts against a stop 48, which in the preferred embodiment shown here is formed by a screw not further specified, with which the open position of the shut-off flap 17 can be adjustably fixed, so that in turn no load is imposed on the piston 41K.

It was mentioned above that to seal the chambers optimally, appropriate sealing elements, advantageously O-rings 49 are used, which are seated in corresponding grooves in the regions of the various chamber openings. It can clearly be seen in FIG. 5 that the O-rings 49—as in the case of the shut-off flaps 3 and 4—are loaded only perpendicular to the O-ring plane. One consequence is that the service life of the O-rings is prolonged, and another is that they can easily be exchanged when the shut-off flaps 3, 4 and 17 are open.

Figure 6:
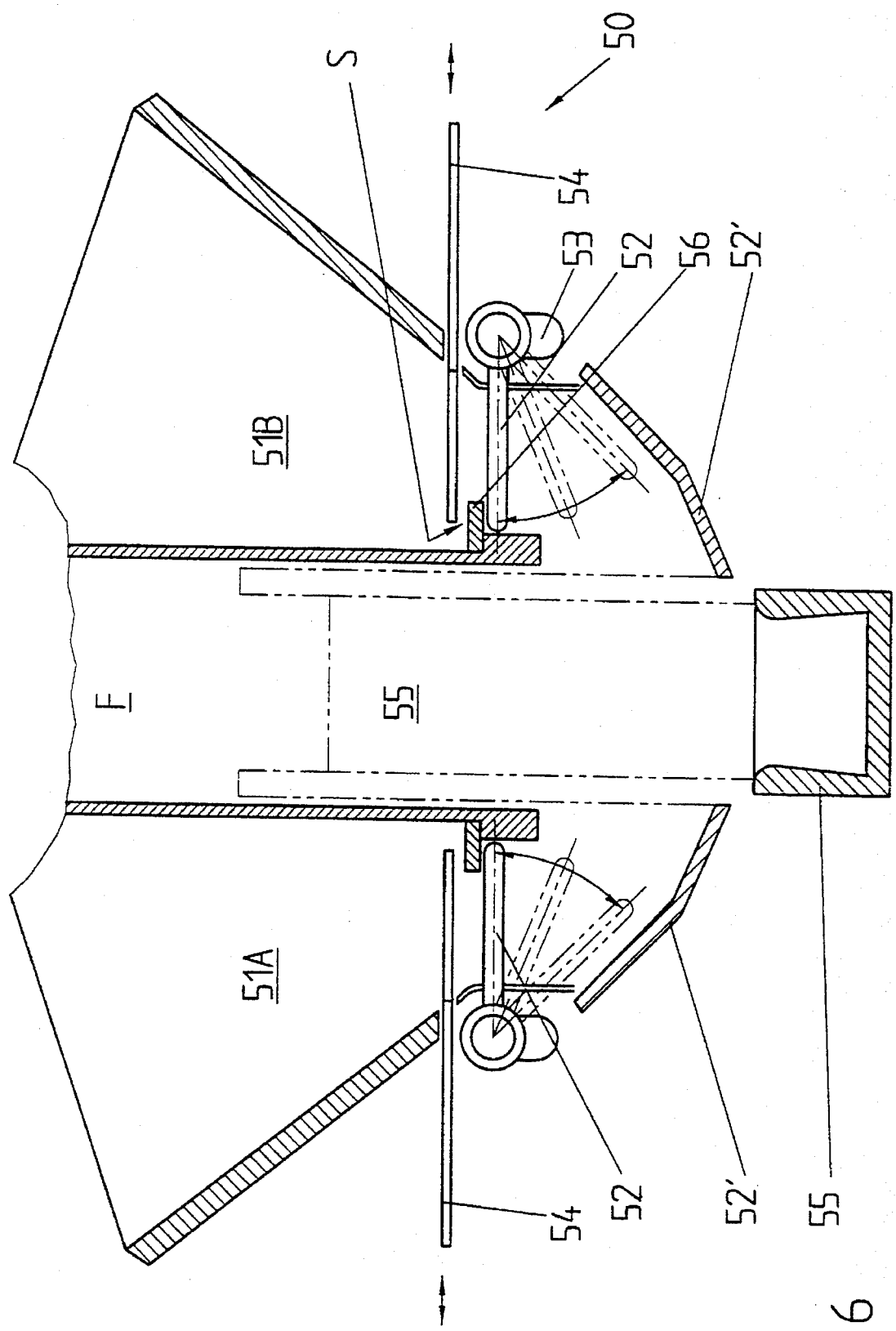
FIG. 6 shows a portioning apparatus in accordance with the invention in cross section along the line VI—VI in FIG. 7.
Figure 7:
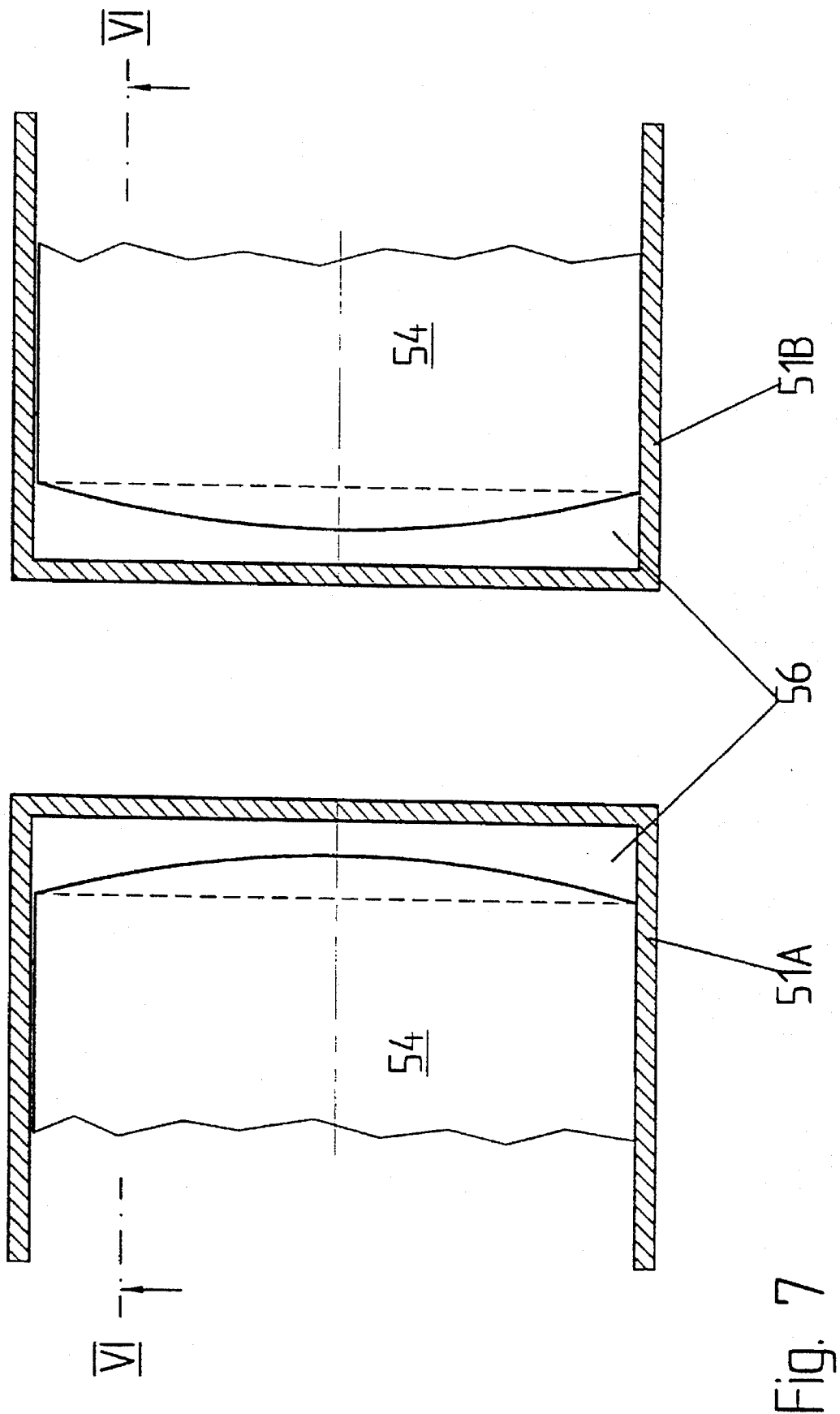
FIG. 7 is a schematic drawing of the portioning apparatus according to FIG. 6 in plan view.

FIGS. 6 and 7, finally, show a portioning apparatus 50 in accordance with the invention, to portion a predetermined amount of long-stemmed pasta products and feed them into the cooking chamber 1. The portioning apparatus 50 is shown in cross section in FIG. 6. It consists substantially of two funnel-shaped containers 51A and 51B, equipped in the region of their floors with a dosing plate 52 the height of which can be adjusted, for example by way of an elongated hole 53. The arrows and dashed drawings of the dosing plates 52 explain their function.

For dosed delivery, the pasta products stored horizontally in the containers 51A and 51B and not shown here are each divided into two amounts by means of linearly displaceable separation plates 54, one amount being the current portion and the other, the remaining stored products. After the dosing plates 52 pivot downward, the pasta products slide along guide sheets 52' into a delivery vessel 55, which in the preferred embodiment shown here is U-shaped in cross section. To deliver the pasta products into the cooking chamber 1, the delivery vessel 55 is tilted up by 90 (, as indicated by the dot-dash lines, and the pasta products slide into the cooking chamber 1.

The construction in accordance with the invention allows the portioning apparatus 50 to be disposed immediately above the cooking-chamber inlet 1E. With this arrangement the desired low overall height is still further reduced. It is of course also possible for a portioning apparatus to be equipped with a single supply container, in which case the delivery vessel must be mounted next to the container in such a way that it can pivot freely.

It can clearly be seen in FIG. 6 that the containers 51A and 51B are constructed with parallel side walls, not further specified, which are spaced apart from one another by at least an amount sufficient to produce a free space F, the dimensions of which correspond to the width of the delivery vessel 55 so that the latter can pivot.

Finally, FIG. 7 shows that in a further development of the invention each separation plate 54 has a rounded edge and that when the separation plates 54 are fully inserted into the supply containers 51A and 51B, the rounded edges rest above projections 56 without touching the parallel walls of the containers. Experiments have shown that this is an extremely effective means, and perhaps even the only means, of portioning spaghetti or macaroni without damaging some of the pasta products.

The rounding is greatly exaggerated in FIG. 7; for orderly function a few millimeters' departure from a straight edge suffices. This is especially important because the pasta products in the lower region of the supply container become softened by the heat rising from the cooking chamber 1. It is impossible for the pasta products, in particular spaghetti, to be crushed or cut off between the container wall and the separation plate 54.

It is particularly useful for a gap S, of a size corresponding approximately to the diameter of the pasta product, to be provided between the separation plates 54 inserted into the supply containers 51A and 51B and the underlying projections 56. As a result, even those raw pasta products that rest in this region cannot be affected by a separation plate 54.

I claim:

1. An apparatus for the discontinuous preparation of portioned pasta products, in particular spaghetti, with a supply container (51A, 51B) to receive the raw pasta products, a cooking chamber (1) and a draining chamber (2), wherein the cooking chamber (1) and the draining chamber (2) can each be closed by valves (3, 17, 4) in the respective inlets (1E, 1A) and respective outlets (1A, 2A), the valve in the outlet region (2A) of the draining chamber (2) being constructed as a shut-off flap (4) that can be linearly displaced, and a single valve (17) being provided in the outlet region (1A) of the cooking chamber (1) and in the inlet region of the draining chamber (2), the improvement in said apparatus characterized in that the valves (3, 4) in the inlet region (1E) of the cooking chamber (1) and in the outlet region (2A) of the draining chamber (2) are shut-off flaps that can be moved linearly while spaced apart from the wall of the chamber (1, 2) containing the respective opening of the valves, in that to close the openings at the end of the linear movement, the shut-off flaps (3, 4) are pressed against the respective chamber (1, 2) in a direction perpendicular to the plane of the opening by means of a lever mechanism (36, 37A, 37B), and in that the valve (17) between the outlet region of the cooking chamber (1) and the inlet region of the draining chamber (2) is constructed as a pivotable shut-off flap (17), which is closed and locked in place by means of a linear drive means and an articulated-lever mechanism (42, 43).

2. The apparatus according to claim 1, having a single motor connected to move said shut-off flaps in both directions.

3. The apparatus according to claim 1, wherein a sliding clutch (34) is provided so that when the shut-off flap (3, 4) has reached its end position during closure, the further linear movement serves to actuate the lever mechanism (36, 37A, 37B).

4. The apparatus according to claim 1, wherein said linear drive means for the pivotable shut-off flat (17) includes a piston/cylinder unit (41).

5. The apparatus according to claim 1, wherein said draining chamber includes a bearing (L), the articulated-lever mechanism (42, 43) for the pivotable shut-off flap (17) comprises an articulated lever (42) pivotably mounted in said bearing (L), a clamping roller (43) disposed at the end of the articulated lever (42) and spaced from the bearing (L), said clamping roller (43) moving the rotatable shut-off flap (17) into its closed position, and the pressure generated during the cooking process and acting on the rotatable shut-off flap (17) being absorbed by the bearing (L).

6. The apparatus according to claim 5, wherein the rotatable shut-off flap (17) comprises a closure wedge (K) to cooperate with the clamping roller (43) to establish said closed position.

7. The apparatus of claim 5, wherein said linear drive means includes a piston, said rotatable shut-off flap (17) including a shoulder (46), which in combination with the articulated-lever mechanism (42, 43) ensures that during the withdrawal movement of the piston (41K) of the linear drive means, the rotatable shut-off flap (17) is reliably and flexibly opened.

8. The apparatus of claim 7, wherein on both sides of the piston (41K) of the linear drive means, covers (47) are arranged in such a way that the entire articulated lever (42) with its clamping roller (43) and a connecting link (44, 45) lie within the covers (47) and are shielded from the lower surface of the rotatable shut-off flap (17).

9. The apparatus of claim 1, wherein sealing elements are located between all shut-off flaps (3, 4, 17) of the openings to improve the closing of the openings.

10. The apparatus according to claim 9, wherein each opening portion (1E, 1A, 2A) of the chambers (1, 2) includes an opening and is surrounded by a sealing element configured to correspond to the contour of the opening.

11. The apparatus according to claim 10, wherein the opening in each opening portion (1E, 1A, 2A) is round in cross section and said each sealing element includes an O-ring (49).

12. The apparatus according to claim 1, wherein each pasta product is stored horizontally in at least one funnel-shaped container (51A, 51B), the floor of each funnel-shaped container (51A, 51B) having a floor disposed to form a dosing plate (52), said floor being ajustably mounted to vary the height of the plate (52), a separation plate mounted above each dosing plate for portioning a desired amount of pasta from the main supply of pasta products, and a delivery vessel (55) is pivotally mounted below each dosing plate, said vessel being pivotable through 90 degrees to transfer the pasta products to the cooking chamber (1).

13. The apparatus according to claim 12, wherein said at least one supply container includes two supply containers (51A, 51B), said containers being mounted in spaced relation with spaced parallel walls forming a free space (CF) adjacent said free space (F) and pivotal into said free space.

14. The apparatus according to claim 12, wherein each separation plate (54) has a rounded shape and a rounded edge, when inserted into the associated supply container (51A, 51B), rests above a projection (56) without touching the wall of the container.

15. The apparatus according to claim 14, wherein between the separation plate (54) pushed into each supply container (51A, 51B) and the projection (56), a gap (S) is present, which corresponds approximately to the diameter of the pasta products being processed.

* * * * *